Oct. 27, 1970        D. G. BOYNTON        3,536,988
INSTRUMENT OUTPUT CURRENT LIMITING CIRCUIT
Filed Feb. 13, 1968

DAVID G. BOYNTON
INVENTOR.

BY T E Kristofferson
ATTORNEY

United States Patent Office 3,536,988
Patented Oct. 27, 1970

3,536,988
INSTRUMENT OUTPUT CURRENT
LIMITING CIRCUIT
David G. Boynton, Whittier, Calif., assignor to Beckman Instruments, Inc., a corporation of California
Filed Feb. 13, 1968, Ser. No. 705,172
Int. Cl. G05f 1/58
U.S. Cl. 323—9                                     7 Claims

ABSTRACT OF THE DISCLOSURE

A current limiting circuit for an instrument output in which the feedback resistor is connected between the emitter and ground from the emitter-follower current output stages and the limiter sensing resistor, load and power supply are connected in series from ground to the collectors of the Darlington connected emitter-follower outputs, such that all of the limiting current which flows through the load will also flow through the feedback impedance, and the load, which may be a recorder, can be connected at or near ground.

CROSS-REFERENCES TO RELATED APPLICATIONS

This case is an improvement to a copending application of A. L. Cliffgard and D. G. Boynton, Ser. No. 589,037, filed Oct. 24, 1966, now Pat. No. 3,440,518 entitled "Voltage-to-current Converter for Use with Measuring Instruments" and assigned to the assignee of the present invention.

BACKGROUND OF THE INVENTION

This invention relates to an instrument output circuit and more particularly to an improved limiting network for such a circuit when it is desired to operate the recorder at or near ground.

Prior art instrument output circuits have provided current limiting which has injected a current into the emitter circuit of the Darlington emitter-follower output stage, which then flows through the load and the feedback resistor to ground. As long as the load is positioned between the emitter and the feedback resistor, this presents no problem. If is is desired to reposition the load, which may be a recorder, at or near ground, then injecting the current at this point creates a problem in that the injected current flows through the feedback resistor to ground and does not flow through the load resistor (the recorder) which results in degradation of the performance of the circuit.

SUMMARY OF THE INVENTION

Accordingly, it is an object of this invention to provide such a circuit in which the injected limiting current flowing through the feedback resistor also flows through the recorder.

Another object of the invention is to provide a circuit in which the available voltage for operating the limiter is enhanced.

These and other objects are achieved by providing a current limiting instrument output circuit employing an amplifier having inverting and non-inverting input terminals and an output terminal. The output terminal of the amplifier is connected to the base input terminal of a Darlington emitter-follower (current output stage) through a resistor. The collectors of the Darlington stage are connected through a source of potential, the load, which may be a recorder, and a current limiting sensing resistor to ground. The output emitter of the Darlington stage is connected through a feedback resistor to ground and from a point on the feedback resistor to the inverting input terminal of the amplifier. The input voltage to be measured is connected from the non-inverting input terminal of the amplifier to ground. The collector-emitter path of the current limiter transistor is connected from the base input terminal of the Darlington stage to the point between the sensing and load resistors, the base of the current limiting transistor being connected through a resistor to ground and through a capacitor to the emitter.

The novel features which are believed to be characteristic of the invention are set forth with particularly in the appended claims. The invention and further objects and advantages thereof can best be understood by reference to the following description and accompanying drawings.

DESCRIPTION OF THE PREFERRED EMBODIMENT

Figure 1:
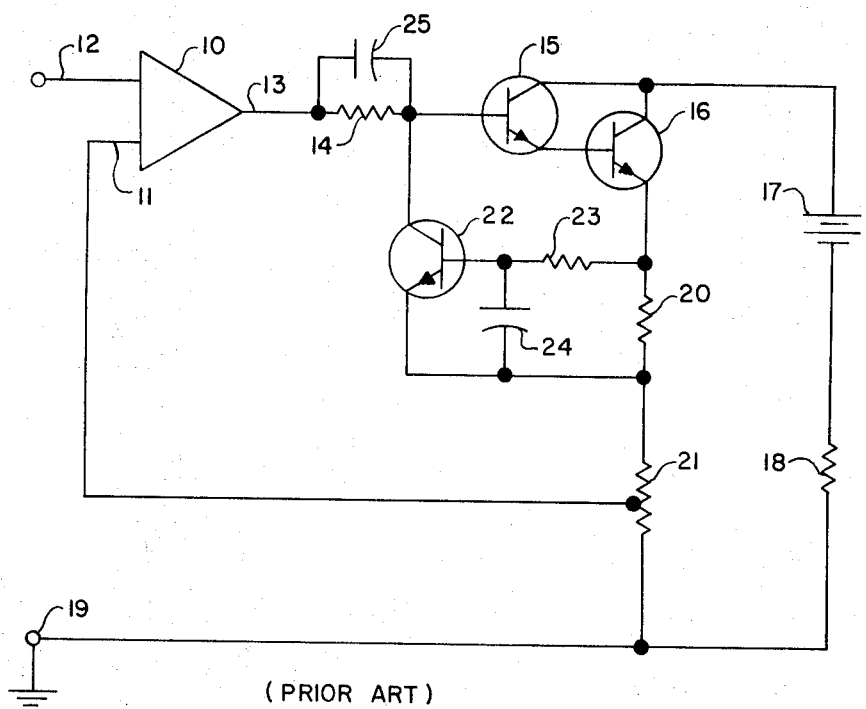
FIG. 1 is a circuit diagram showing a prior art limited current output circuit employed to connect a recorder or load resistor at or near ground.
Figure 2:
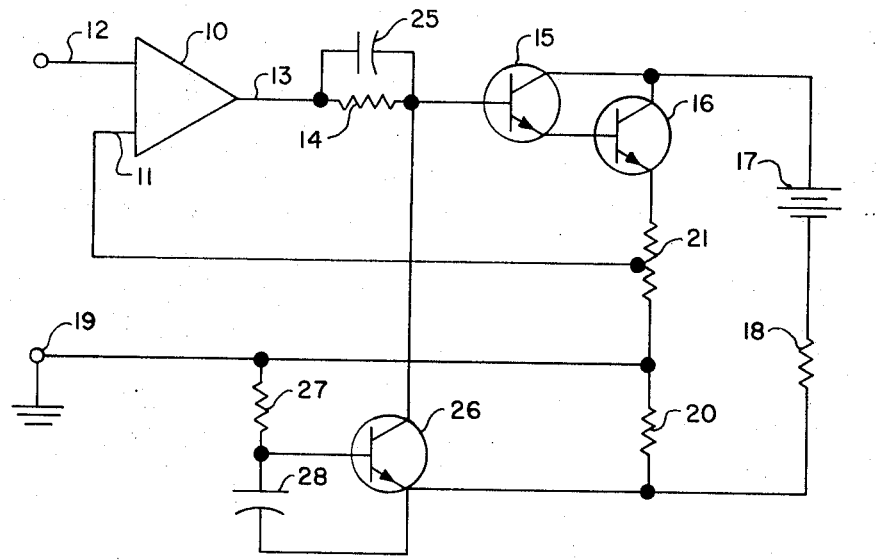
FIG. 2 is a circuit diagram illustrating the invention.

Turning now to the drawings, in FIGS. 1 and 2 corresponding parts serving similar functions have been designated by identical numerals. In the prior art circuit of FIG. 1 an amplifier 10 has an inverting input terminal 11, a non-inverting input terminal 12 and an output terminal 13. The output terminal 13 is connected through a current limiting resistor 14 to the base electrode of transistor 15 which is connected in a Darlington emitter follower configuration with transistor 16 by interconnecting their collectors and connecting the emitter of 15 to the base of 16 to form an emitter-follower current output circuit, The collectors of transistors 15 and 16 are connected through a source of potential 17 and a load 18, which may be a recorder, to the ground terminal 19. The input to amplifier 10, the voltage to be measured, is connected from the non-inverting terminal 12 to the terminal 19. The output of the Darlington emitter follower circuit, including transistors 15 and 16, is taken from the emitter of transistor 16 which is connected through a current limiting sensing resistor 20 in series with a feedback resistor 21 to terminal 19. A point on resistor 21 is connected back to inverting terminal 11 of amplifier 10 to provide feedback.

A limiting network including transistor 22 is connected by connecting the base of transistor 15 to the collector of transistor 22 and the emitter of transistor 22 to the point between resistors 20 and 21. The emitter of transistor 16 is connected through a resistor 23 to the base of transistor 22 and the base and emitter of transistor 22 are capacitively coupled by a capacitor 24. A shunting capacitor 25 shunts resistor 14.

In this prior art circuit the recorder or load resistor 18 has one extremity connected to terminal 19, or at or near ground. However, when limiting occurs the current which flows through the transistor 22 flows down through resistor 21 to ground and does not flow through the load resistor 18. Since the current flowing out of the emitter of transistor 16 is essentially the same as that flowing through the load resistor 18, because the base current of transistor 15 is negligible, the current flowing in the feedback resistor 21 is the sum of the current flowing in the load and that flowing in the transistor 22. Thus the current in the transistor 22 provides an error in the feedback voltage fed back to the inverting terminal 11 of amplifier 10, since the potential developed across resistor 21 is representative of the sum of these currents and not of the current flowing in the load alone.

To illustrate the invention, refer to the circuit of FIG. 2 which again has the amplifier 10 with the inverting and non-inverting input terminals 11 and 12 and output terminal 13. Again the resistor 14 is connected from the output terminal 13 to the base of transistor 15 which is connected in Darlington configuration with transistor 16. In FIG. 2 the interconnected collectors of transistors 15 and 16 are connected through the source of potential 17, the load or recorder 18 and the sensing resistor 20 to the ground terminal 19. The output from the emitter of transistor 16 is connected through the feedback resistor 21 to terminal 19, and a point on resistor 21 is connected to the inverting terminal 11 of amplifier 10. Resistor 14 is again shunted by the capacitor 25.

The limiting circuit, or current limiting device, in FIG. 2, however, is connected by connecting the transistor 26 with its base connected to the terminal 19 through resistor 27, its base and emitter shunted by the capacitor 28, its collector connected to the base of transistor 15 and its emitter connected to the junction between resistors 18 and 20. In the circuit of the invention illustrated in FIG. 2, the current flowing through the feedback resistor 21 is essentially the same as the current flowing into the collectors 15 and 16, or the load current flowing through the resistor 18. This is so because the base current in transistor 15 is negligible. Therefore, the feedback potential developed across the resistor 21 does not degrade the system in that it is representative of the same current that flows in the load.

When the load current increases to the point where limiting is to occur the potential developed across resistor 20 will turn on transistor 26, holding the potential at the base of transistor 15 at the desired value. The current flowing out of the emitter of transistor 26 can either flow through the resistor 20 to ground terminal 19 or through the load resistor 18 and back through transistors 15 and 16 and through resistor 21 to ground. To the extent that any of this limiting current flows through the load it also flows through the resistor 21 such that the feedback potential developed across the resistor 21 by the current flowing therethrough is indicative of the current flowing through the load.

Although the recorder or load resistor 18 is not directly connected to ground in the embodiment of FIG. 2 it is effectively connected thereto because typical values of the impedances 20 and 21 would be 10 ohms and 1300 ohms, respectively. The capacitor 25 serves to preserve the stability of the loop as it was before the protective circuit was added by adding phase lead to compensate for the phase lag introduced when resistor 14 is inserted together with the limiter.

The circuit of FIG. 2 has the additional advantage over the circuit of FIG. 1 in that the collector-base voltage available to the transistor 22 of FIG. 1 is limited by the two base to emitter voltages of transistors 15 and 16, whereas the collector-base voltage in the circuit of FIG. 2 may be substantially larger.

The limiting circuit described herein is useful, for example, in the universal instrument output circuit described in the above-referenced application in which the amplifier 14 acts as amplifier 10 herein and transistors 17 and 18 as 15 and 16 herein with the R-C network 14, 25 of the present case inserted therebetween. The limiter is connected by inserting the sensing resistor 20 of this application between ground 15 and terminal 22 of the referenced application and connecting the limiting transistor 26 of this application between terminals 22, 15 and the base of transistor 17 of the referenced application.

It can also be seen that the value of the limiting current is dependent on the emitter-base voltage of transistor 26. Since this voltage changes with respect to temperature, then the substitution of a differential transistor stage in place of transistor 26 will provide a constant current limiting point with respect to temperature.

Obviously the transistor types and polarities indicated are only shown by way of example and are not intended to be limiting.

Since the principles of the invention have now been made clear, modifications which are particularly adapted for specific situations, without departing from those principles, will be apparent to those skilled in the art. The appended claims are intended to cover such modifications as well as the subject matter described and to only be limited by the true spirit of the invention.

What is claimed is:

1. A current limiting instrument output circuit comprising:
    an amplifier having inverting and non-inverting input terminals and an output terminal;
    an emitter-follower current output circuit;
    a current limiting resistor connecting said output terminal to the base input terminal of said emitter follower;
    a ground terminal;
    a feedback resistor connected from the emitter output terminal of said emitter-follower to said ground terminal;
    means connecting a point on said feedback resistor to said inverting input terminal;
    a source of potential, a load and a current sensing resistor connected in series between the collector output terminal of said emitter-follower and said ground terminal;
    a current limiting device having input and output terminals;
    means connecting the output terminals of said device between the base input terminal of said emitter-follower and the point between said sensing resistor and load;
    means connecting the input terminals of said device across said sensing resistor; whereby the entire load current flows in both said load and said feedback resistor.

2. The circuit of claim 1 in which said emitter-follower is a Darlington emitter-follower.

3. The circuit of claim 2 in which a capacitor shunts said current limiting resistor.

4. The circuit of claim 1 in which said device is a transistor having its collector connected to the base input terminal of said emitter-follower, its emitter connected to the point between said sensing resistor and load and its base connected through a resistor to said ground terminal.

5. The circuit of claim 4 in which a capacitor shunts the base-emitter terminals of said device.

6. The circuit of claim 3 in which said device is a transistor having its collector connected to the base input terminal of said emitter-follower, its emitter connected to the point between said sensing resistor and load and its base connected through a resistor to said ground terminal.

7. The circuit of claim 6 in which a capacitor shunts the base-emitter terminals of said device.

References Cited

UNITED STATES PATENTS

| 3,311,814 | 3/1967 | Cliffgard | 323—9 |
| 3,392,317 | 7/1968 | Eberts et al. | 321—1 X |
| 3,436,563 | 4/1969 | Regitz | 307—237 X |

J. D. MILLER, Primary Examiner

A. D. PELLINEN, Assistant Examiner

U.S. Cl. X.R.

323—17